Patented Mar. 7, 1950

2,500,023

UNITED STATES PATENT OFFICE 2,500,023

POLYMERIZATION OF SUBSTITUTED ETHYLENES CONTAINING ORGANIC COLORING MATTER IN PRESENCE OF AZO COMPOUNDS

Robert E. Burk, Wilmington, Del., assignor to E. I. du Pont de Nemours & Company, Wilmington, Del., a corporation of Delaware No Drawing. Application March 16, 1946, Serial No. 655,011

8 Claims. (Cl. 260—41)

This invention relates to colored polymers and the process of preparing such polymers and, more particularly, to the preparation of polymers colored with organic compounds, either dyes or pigments.

Heretofore various peroxides have been used as catalysts in the polymerization of substituted ethylenes such as vinyl and vinylidene compounds. Such catalysts include benzoyl peroxide, the most commonly used catalyst, acetyl peroxide, acetyl-benzoyl peroxide, and certain long chain peroxides such as lauroyl peroxide and stearoyl peroxide.

While these peroxide catalysts have been fairly satisfactory for use in the preparation of transparent colorless solid polymers or, in most instances, polymers colored entirely by inorganic pigments, they have caused considerable difficulty where organic coloring matter has been present in the polymerizable mixture. The peroxide catalysts in some manner exert a destructive effect upon organic coloring matter during the polymerization reaction with the result that the polymer formed is usually faded or off-color. This is especially noticeable with blue or green dyes but is a matter of concern, in greater or less degree, with organic coloring matter generally, including both soluble dyes and insoluble pigments.

Some peroxides such as the long chain peroxides previously mentioned, offer a fair degree of improvement with respect to this fading as compared to such commonly used peroxides as benzoyl peroxide or acetyl peroxide but even these long chain peroxides tend to reduce the intensity of the coloring in the course of the polymerization reaction and their feasible use is limited to a small number of particularly stable organic dyes and pigments.

An object of the present invention is to provide an improved process of preparing polymers colored with organic coloring matter. A further object is to provide a process of preparing polymers of substituted ethylenes colored with organic dyes or pigments. A particular object is to provide a process of preparing polymers of substituted ethylenes colored with organic coloring matter without destructive effect on the organic coloring matter during the polymerization reaction. Still further, an object of the invention is to provide an improved process of preparing polymerized methyl methacrylate colored with organic dyes or pigments. Other objects will be apparent from the description of the invention given hereinafter.

The above objects are accomplished according to the present invention by polymerizing a polymerizable substituted ethylene containing organic coloring matter in the presence of a colorless, non-aromatic azo compound as a catalyst and in the absence of peroxide catalyst.

It has been found that, in contrast to the behavior of peroxide catalysts, the azo compounds herein considered, although highly effective as polymerization catalysts, differ, greatly to their advantage, in having substantially no destructive effect on organic coloring matter during the polymerization of substituted ethylenes. That is, in the case of many dyes and organic pigments, these azo compounds have apparently no deleterious effect at all during the polymerization while, in the case of all organic coloring matter tested, these azo compounds have appreciably less adverse effect than the peroxide-type catalysts used in proportion to give the equivalent catalytic action. The polymerization is generally carried out in the presence of .0005% to 0.5%, by weight of the monomer to be polymerized, of the azo compound, more preferably, .001% to 0.07%. The proportion of organic dye and/or pigment will depend upon the color effect desired.

The following examples, in which all proportions are by weight unless otherwise stated, illustrate specific embodiments of the present invention:

EXAMPLE I

Solutions of dyes in methyl methacrylate monomer were made up as indicated in Tables I, II and III. To one series of these solutions, 0.04%, by weight of the monomer, of alpha, alpha'-azodiisobutyronitrile was added as the polymerization catalyst (Table I), to a second series, 0.08% of benzoyl peroxide (Table II), and to a third series, 0.096% of lauroyl peroxide (Table III). The proportion of catalyst was adjusted in the case of each catalyst so that the catalysts in all of the solutions were about equal in their capability of activating the polymerization of the monomer.

The catalyzed solutions were transferred to small glass ampoules and sealed under vacuum. Thereupon, the monomer in each ampoule was polymerized by heating the ampoules in constant temperature reflux baths at 56° C., 80° C., and 100° C. overnight. Duplicates of each sample were held in a refrigerator for purposes of comparison.

In the following three tables are given the color comparison of polymers prepared as above, Tables I, II and III listing the samples containing alpha, alpha'-azodiisobutyronitrile, benzoyl peroxide, and lauroyl peroxide, respectively. The coding for the "Degree of fading" in these tables as well as in Table IV hereinafter referred to, is as follows:

Degree of fading:
1. No fading
2. Slight fading
3. Moderate amount of fading
4. Completely faded

*Table I*

| Dye | Conc. of Dye in Methyl Methacrylate, Percent | Degree of Fading | | |
|---|---|---|---|---|
| | | 56° C. | 80° C. | 100° C. |
| Red 4062 for Nitrocellulose Varnish | 0.033 | 1 | 1 | 1 |
| Eastone Yellow 6 GN | 0.033 | 1 | 1 | 1 |
| Anthraquinone Green G Base | 0.008 | 1 | 1 | 1 |
| Calco Condensation Green CG | 0.008 | 1 | 1 | 1 |
| Blue B for Acetyl Cellulose Varnish | 0.008 | 1 | 1 | 1 |
| Celliton Fast Blue AF | 0.033 | 1 | 1 | 1 |
| Eastman Blue BNN | 0.033 | 1 | 1 | 1 |
| Eastman Fast Violet 5 RLF | 0.033 | 1 | 1 | 1 |

*Table II*

| Dye | Conc. of Dye in Methyl Methacrylate, Percent | Degree of Fading | | |
|---|---|---|---|---|
| | | 56° C. | 80° C. | 100° C. |
| Red 4062 for Nitrocellulose Varnish | 0.033 | 3–4 | 2–3 | 2 |
| Eastone Yellow 6 GN | 0.033 | 2 | 1 | 1 |
| Anthraquinone Green G Base | 0.008 | 4 | 4 | 3 |
| Calco Condensation Green CG | 0.008 | 2 | 3 | 3 |
| Blue B for Acetyl Cellulose Varnish | 0.008 | 3–4 | 4 | 4 |
| Celliton Fast Blue AF | 0.033 | 3 | 2 | 1 |
| Eastman Blue BNN | 0.033 | 3 | 2 | 2 |
| Eastman Fast Violet 5 RLF | 0.033 | 4 | 3 | 3 |

*Table III*

| Dye | Conc. of Dye in Methyl Methacrylate, Percent | Degree of Fading | | |
|---|---|---|---|---|
| | | 56° C. | 80° C. | 100° C. |
| Red 4062 for Nitrocellulose Varnish | 0.033 | 2 | 2 | 1 |
| Eastone Yellow 6 GN | 0.033 | 3 | 2 | 2 |
| Anthraquinone Green G Base | 0.008 | 1 | 1 | 1 |
| Calco Condensation Green CG | 0.008 | 3 | 2 | 2 |
| Blue B for Acetyl Cellulose Varnish | 0.008 | 1 | 1 | 1 |
| Celliton Fast Blue AF | 0.033 | 2 | 2 | 2 |
| Eastman Blue BNN | 0.033 | 3 | 1 | 1 |
| Eastman Fast Violet 5 RLF | 0.033 | 3 | 1 | 1 |

EXAMPLE II

Methyl methacrylate sheet casting syrups were made up containing dyes as indicated in Table IV, series A containing 0.025%, by weight of the monomer, of alpha,alpha'-azodiisobutyronitrile, and series B containing 0.05% of lauroyl peroxide, the proportions of catalysts giving substantially equal catalytic effect to the two series of syrups.

Sheets were made from each of the casting syrups according to conventional sheet casting technique. That is, the syrup was poured between glass plates separated by a flexible gasket and the polymerization carried out identically in each instance according to the disclosure in Rohm and Bauer, U. S. Patent 2,154,639. Samples of unpolymerized syrup were retained in a refrigerator for comparison in color with the cast sheets. Table IV below gives the comparison of results using alpha,alpha'-azodiisobutyronitrile and lauroyl peroxide.

*Table IV*

| Dye | Grams of Dye per Lb. of Sheet Casting Syrup | Degree of Fading | |
|---|---|---|---|
| | | Series A | Series B |
| Anthraquinone Green G Base | 0.018 | 1 | 3 |
| Calcophen Yellow R | 0.080 | 1 | 3 |
| Calco Condensation Green CG | 0.060 | 1 | 3 |

EXAMPLE III

The following color formula was thoroughly dispersed in methyl methacrylate monomer to yield a casting syrup:

| | Grams of pigment per lb. of casting syrup |
|---|---|
| Copper phthalocyanine pigment | 1.10 |
| Titanium dioxide pigment | 0.14 |
| Cadmium sulfide yellow | 0.22 |

To this syrup was added 0.036 gram, per pound of syrup, of alpha,alpha'-azodiisobutyronitrile and the whole thoroughly mixed. The syrup was then loaded into an elongated cylindrical metal mold and the polymerization carried out according to the process disclosed in Fields U. S. Patent 2,057,674 to yield an opaque green rod.

It will be understood the above examples are merely illustrative and that the invention broadly comprises subjecting to polymerizing conditions a polymerizable substituted ethylene containing organic coloring matter in the presence of an azo compound of the type herein described and in the absence of peroxide catalysts.

The present invention is applicable generally to polymerizable negatively substituted ethylenes having only isolated open chain carbon to carbon unsaturation and that ethylenic. They have on one of the ethylenically bonded carbons a negative or electron-attracting group and in general have a polarized double bond. The great majority have a terminal methylene group and are formulated as containing a $CH_2=C=$ group at least one of the free valences of which is satisfied by a negative group, i. e., an electron attractive group, i. e., a group substantially increasing the electrical dissymmetry or polar character of the molecule, i. e., a group conferring on the molecule a permanent dipole and increased electric moment. Two or more such monomers may be copolymerized in the process of this invention. Illustrative monomers which may be polymerized or copolymerized in the process of this invention include polymerizable acrylyl and alkacrylyl compounds, e. g., acrylic, haloacrylic, methacrylic acids, esters, nitriles, and amides, such as, for example, acrylonitrile, methyl methacrylate, butyl methacrylate, octyl methacrylate, methoxymethyl methacrylate, chloroethyl methacrylate and the corresponding esters of acrylic and alpha-chloroacrylic acids: vinyl and vinylidene halides, e. g., vinyl chloride, vinyl fluoride, vinylidene chloride, vinylidene fluoride, 1-fluoro-1-chloroethylene; vinyl carboxylates, e. g., vinyl acetate, vinyl chloroacetate, vinyl propionate and vinyl stearate; N-vinylimides, e. g., N-vinylphthalimide and N-vinylsuccinimide; N-vinyl-lactams, e. g., N-vinylcaprolactam and N-vinylbutyrolactam; and vinyl aryls, e. g., styrene and vinylnaphthalene. Other compounds which can be polymerized or copolymerized include methyl vinyl ketone, chlorotrifluoroethylene, methyl fumarate, etc.

Polymerizable compounds having more than one isolated ethylenic double bond include ethylene dimethacrylate, diallyl diglycollate, diallyl carbonate, diallyl phthalate, methacrylic anhydride, etc.

Inasmuch as the primary purpose of the present invention is to provide colored polymers, either transparent, translucent, or opaque, in which the color in the polymer remains true as compared with an unpolymerized control sample, and, further, since the invention is predicated upon the discovery that a class of azo compounds are active catalysts for the polymerization reaction and at the same time exert either no destructive effect on organic coloring matter or a minimum effect whereas peroxide catalysts in general exert a marked destructive effect, it follows that the exclusion of peroxide catalysts is a necessary condition of the process of this invention and, also, that only colorless azo compounds should be employed as catalysts. While it would be possible, of course, to use deliberately azo catalysts which themselves introduce color into the polymer, this would present a complicating factor extremely difficult to deal with and is not contemplated within the scope of the present invention.

The azo catalysts adapted for use in the present invention are colorless, non-aromatic azo compounds, i. e., colorless, wholly aliphatic, including cycloaliphatic, azo compounds and especially colorless acyclic azo compounds. Particularly preferred are those colorless azo compounds wherein both valences of the azo group are satisfied by completely aliphatic, including cycloaliphatic, radicals bonded to the nitrogen from tertiary aliphatic carbon further bonded to a negative substituent of the class consisting of the nitrile, carbalkoxy and carbon-amido groups.

Examples of the azo catalysts are alpha, alpha'-azodiisobutyronitrile, alpha.alpha'-azobis(alpha.-gamma-dimethyl-valeronitrile), dimethyl and diethyl alpha.alpha'-azodiisobutyrate, 1,1'-azodi-cyclohexanecarbonitrile, alpha alpha' - azobis (alpha - methylbutyronitrile), alpha,alpha'-azobis(alpha-ethylbutyronitrile), and alpha,alpha'-azodiisobutyrocarbonamide.

The polymerization of methyl methacrylate is a particularly preferred species of the invention. With this monomer the preferred group of catalysts give especially desirable results. The preferred class of catalysts is that of colorless, wholly aliphatic, including cycloaliphatic, azo compounds in which the azo group is bonded to two different tertiary carbon atoms having on said tertiary carbon a monovalent group bonded from carbon of said group which carbon has its three remaining valences satisfied by atoms of atomic number 7 to 8, the monovalent group being both negative, i. e., an electron attractive group, and also neutral from the acidity standpoint. This class of negative neutral groups consists in the nitrile carbalkoxy and carbonamido groups, i. e., any valence of the element of atomic number 7 not satisfied by the carbon attached to the tertiary carbon is satisfied by hydrogen and any valence of the element of atomic number 8 not satisfied by carbon attached to the tertiary carbon is satisfied by an alkyl group.

While desirable results are obtained with methyl methacrylate as the sole monomer, minor amounts of other monomeric materials may be polymerized with the methacrylate, for example, up to 10% of styrene, vinyl acetate, butyl methacrylate, octyl methacrylate, acrylic esters, methacrylic acid, methacrylic anhydride, crotonyl methacrylate, ethylene dimethacrylate, and the like, with exceptionally good results.

The present invention is applicable to the polymerization of monomers in which organic coloring matter is either dissolved or mixed without dissolving. Depending upon whether the organic coloring matter is soluble or not, and on the amount used, colored solid polymers may be produced which are transparent, translucent, or opaque. Further, inorganic pigments, which as a class are not subject to fading during the polymerization reaction even in the presence of peroxide-type catalysts, may be included along with the organic coloring matter as illustrated in Example III in which titanium dioxide pigment is employed. Obviously, the invention contemplates the use of mixtures of two or more organic pigments or dyes and the combination of both soluble and insoluble coloring matter.

On the basis of the wide assortment of organic coloring matter tested, it is believed that the whole broad class of organic dyes and pigments is operative in the present invention in that the coloring matter is not affected at all during polymerization or is affected to an appreciably lesser extent than when peroxide-type catalysts are used. The organic pigments include phthalocyanine, copper phthalocyanine, chlorinated copper phthalocyanine and Sulphanthrene Pink FF, which are examples of insoluble pigments; as well as the lakes which are organic dyes insolubilized by precipitation on a carrier, examples of which are the phosphotungstic lake of Victoria Blue, the phosphotungstic lake of Crystal Violet, the phosphotungstic lake of Rhodamine 6.G. the barium lake of Alizarin Saphirol, the aluminum hydrate lake of Tartrazine and the aluminum hydrate lake of Alizarin.

The invention is not restricted to any particular method of polymerization of the polymerizable ethylenic compound. Normally, the polymerization will be carried out in the liquid phase and it may be by the bulk, emulsion, or granular technique known in the art. The coloring matter and azo catalyst may be added either to the monomer before polymerization, or to a monomer-polymer syrup, the latter procedure being disclosed in Fields U. S. Patent 2,057,674 and Kuettel U. S. Patent 2,084,399. Ultra-violet radiation increases the rate of polymerization and is particularly effective at low temperatures, a temperature of 0° C. to 40° C. being preferred in light activated polymerization although higher or lower temperatures can be used. The use of ultra-violet light is, of course, restricted to organic coloring matter not affected thereby.

Ordinarily the polymerization will be carried out within the temperature range of 0° C. to 140° C. and it is preferred to polymerize at a relatively low temperature of 45° C. to 80° C., particularly in the case of methyl methacrylate. Those skilled in the art will appreciate that the optimum polymerization temperature will depend upon the monomer and the azo catalyst employed.

A further factor influencing the temperature selected is the particular organic coloring matter used. By the present invention, the destructive effect of the peroxide catalyst on the coloring matter is substantially eliminated or sharply reduced but, clearly, organic dyes and pigments which inherently lack stability at elevated temperature, are still going to be affected if the polymerization is carried out at a temperature at which they are not stable. An advantage of these azo catalysts is that they permit polymerization at relatively low temperatures so that it becomes feasible to use organic coloring matter that would not dependably withstand the higher temperatures conventionally used in polymerizations in the presence of benzoyl peroxide catalysts, even entirely disregarding the destructive effect of the peroxide catalyst itself.

An advantage of the present invention is that it provides a practical means of preparing solid polymers in a wide variety of colors heretofore unattainable and, particularly, makes possible the use of a great assortment of organic dyes and pigments that could not be used satisfactorily with peroxide-type catalysts. It had been an exceptionally severe problem in the art to produce satisfactory shades of green and blue in polymerized methyl methacrylate prior to the present invention which provides a simple means of producing fast, transparent polymers in a variety of shades of green and blue. A further advantage of the invention is that, in addition to the fact that fading of the organic coloring matter during the polymerization reaction is eliminated or reduced to the point where it is not objectionable, the colored polymers produced are just as fast to outdoor weathering and sunlight exposure and to the action of ultra-violet light in accelerated weathering tests as any colored polymers heretofore produced.

As many apparently widely different embodiments of this invention may be made without departing from the spirit and scope thereof, it is to be understood that the invention is not limited to the specific embodiments thereof except as defined in the appended claims.

I claim:

1. In a process of polymerizing a liquid, polymerizable, monomeric ethylenic compound having a negative substituent on one of the ethylenic carbons and having only isolated carbon to carbon aliphatic unsaturation and that ethylenic, to form a colored polymer, the step which comprises adding to said monomeric ethylenic compound organic coloring matter fadable by the presence of benzoyl peroxide during polymerization, and a colorless non-aromatic azo compound having both valences of the azo group attached to different tertiary carbons further bonded to a group of the class consisting of the nitrile, carbalkoxy, and carbonamido groups, and thereafter carrying out the polymerization of said monomeric ethylenic compound in the absence of a peroxide polymerization catalyst.

2. Process as recited in claim 1 wherein said azo compound is alpha,alpha'-azodiisobutyronitrile.

3. In a process of polymerizing a liquid, polymerizable, monomeric ethylenic compound having a negative substituent on one of the ethylenic carbons and having only isolated carbon to carbon aliphatic unsaturation and that ethylenic, to form a colored polymer, the step which comprises adding to said monomeric ethylenic compound an organic dye soluble therein and fadable by the presence of benzoyl peroxide during polymerization, and a colorless, non-aromatic azo compound having both valences of the azo group attached to different tertiary carbons further bonded to a group of the class consisting of the nitrile, carbalkoxy, and carbonamido groups, and thereafter carrying out the polymerization of said monomeric ethylenic compound in the absence of a peroxide polymerization catalyst.

4. Process as set forth in claim 3 wherein said ethylenic compound is methyl methacrylate.

5. Process as set forth in claim 3 wherein said ethylenic compound is methyl methacrylate and said azo compound is alpha,alpha'-azodiisobutyronitrile.

6. Process as recited in claim 1 wherein said ethylenic compound is methyl methacrylate.

7. Process as recited in claim 6 wherein the polymerization is carried out at a temperature of 45° C. to 80° C.

8. Process as recited in claim 4 wherein the polymerization is carried out at a temperature of 45° C. to 80° C.

ROBERT E. BURK.

REFERENCES CITED

The following references are of record in the file of this patent:

UNITED STATES PATENTS

| Number | Name | Date |
|---|---|---|
| 2,168,331 | Fields | Aug. 8, 1939 |
| 2,209,246 | Bauer | July 23, 1940 |
| 2,376,014 | Semon | May 15, 1945 |
| 2,394,025 | Te Grotenhuis | Feb. 5, 1946 |